No. 874,054.  
PATENTED DEC. 17, 1907.  
F. H. DUKESMITH.  
AIR BRAKE SYSTEM.  
APPLICATION FILED MAY 6, 1905.
2 SHEETS—SHEET 1.
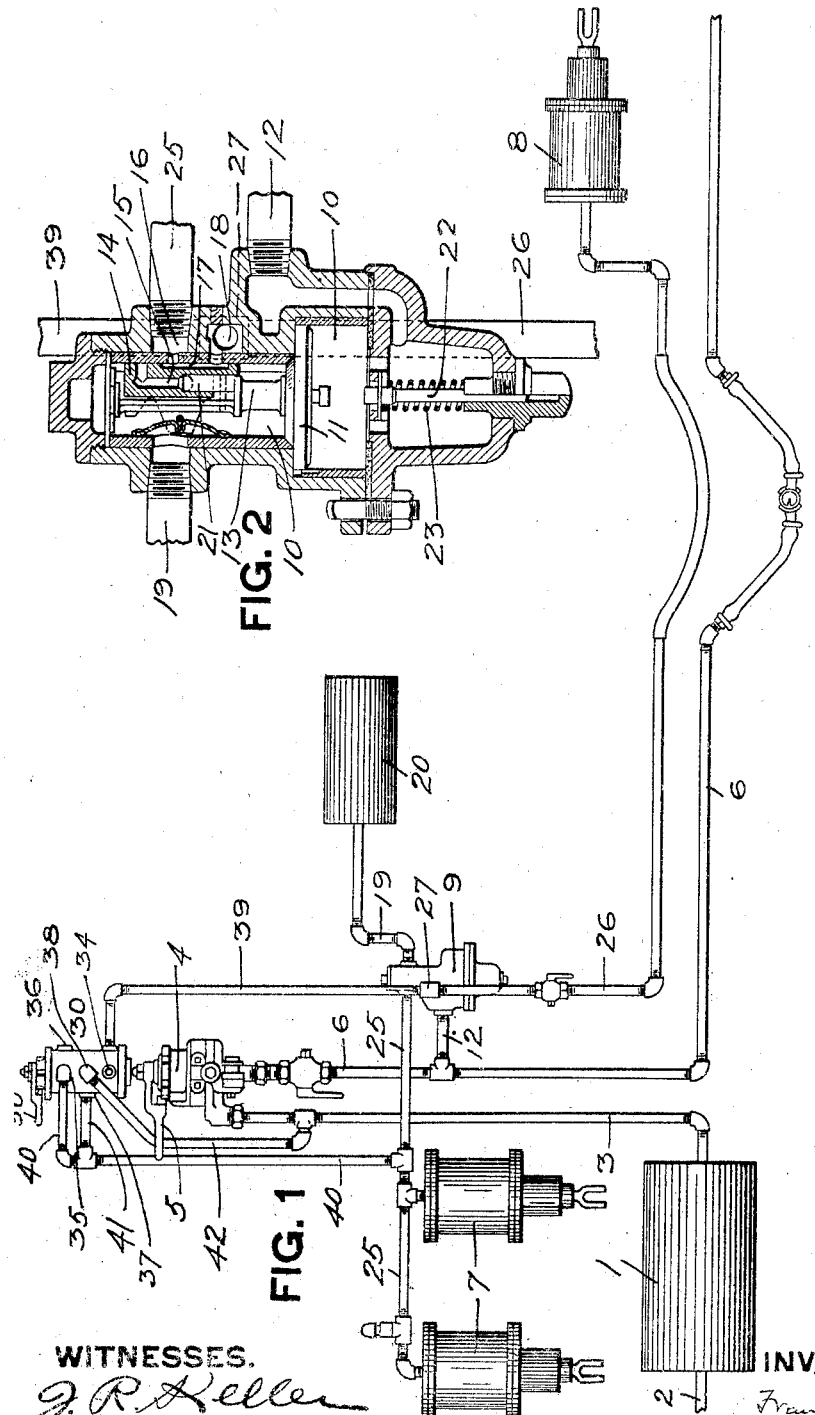
WITNESSES.  
INVENTOR.

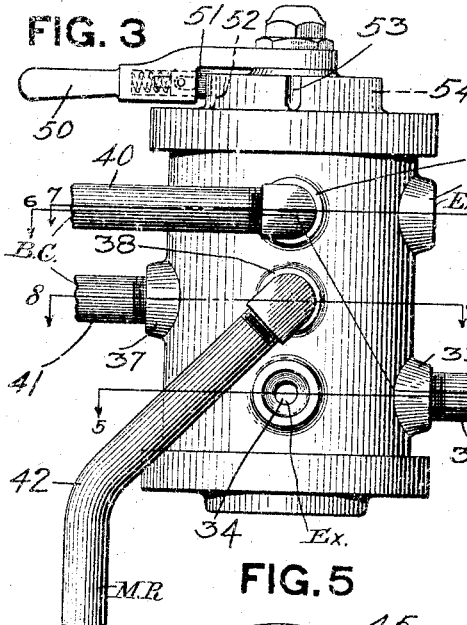
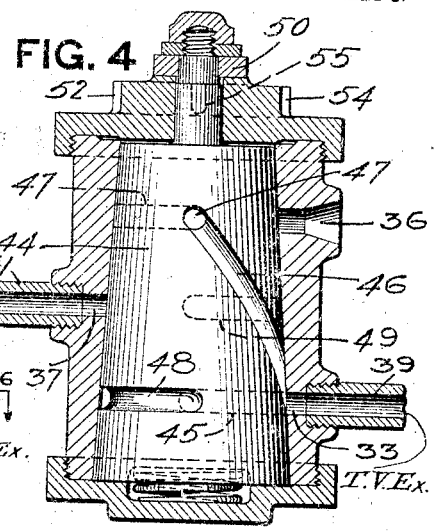
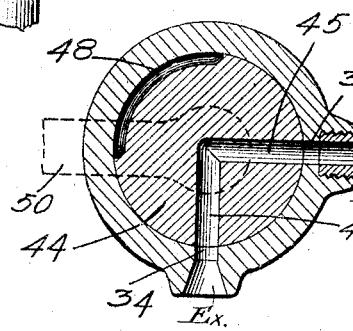
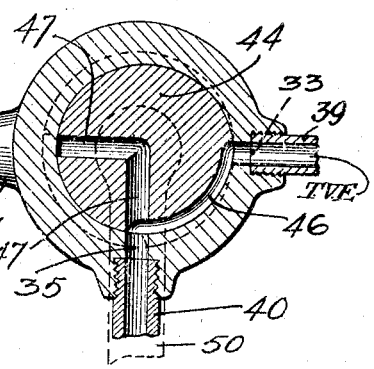
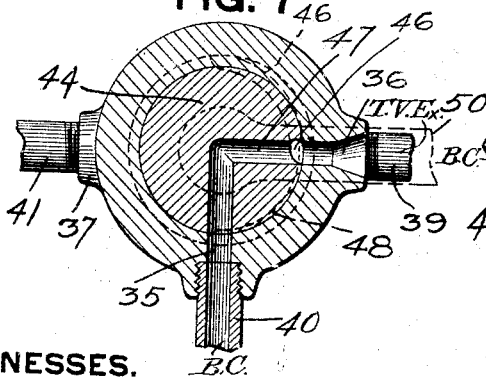
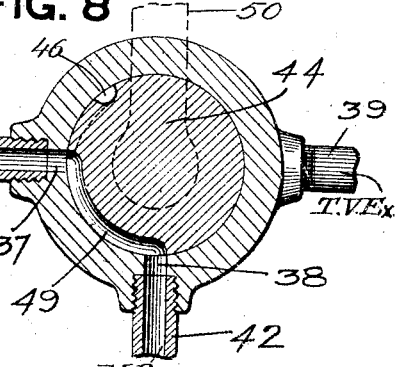

UNITED STATES PATENT OFFICE.

FRANK H. DUKESMITH, OF MEADVILLE, PENNSYLVANIA, ASSIGNOR TO THE DUKESMITH AIR BRAKE COMPANY, OF PITTSBURG, PENNSYLVANIA, A CORPORATION OF WEST VIRGINIA.

AIR-BRAKE SYSTEM.

No. 874,054.   Specification of Letters Patent.   Patented Dec. 17, 1907.

Application filed May 6, 1905. Serial No. 259,181.

*To all whom it may concern:*

Be it known that I, FRANK H. DUKESMITH, resident of Meadville, in the county of Crawford and State of Pennsylvania, have invented a new and useful Improvement in Air-Brake Systems; and I do hereby declare the following to be a full, clear, and exact description thereof.

My invention relates to air-brake systems for railway cars, and its object, generally stated, is to provide a system wherein the engineer may control the locomotive driver and tender brakes separately from the train brakes or in unison therewith, as may be desired.

A further object of the invention is to provide an automatic air brake system in which by means of a single valve the engineer may control the locomotive driver brakes separately from the train brakes or in unison therewith, and may also when desired apply the locomotive driver brakes by air admitted directly from the main reservoir.

A further object of the invention is to provide an air-brake system in which the usual triple valve for the locomotive tender brake cylinder is dispensed with, thus overcoming the annoyance from freezing and clogging due to the condensation of the moisture in the compressed air and the accumulation of dirt which ordinarily gathers at the tender triple valve.

One of the defects of existing air brake systems is the lack of independent control by the engineer of the locomotive driver brakes and the train brakes. This defect gives rise to many serious conditions, and results in much damage, such as pulled out draw heads, strained draft mechanism, jolting of the train, breaking apart of the train, or the sliding and heating of the locomotive tires.

In bringing a train to a stop with the most improved automatic air brake systems now in use the locomotive driver brakes are applied simultaneously with the train brakes, and if the application continues for a considerable period of time there is danger of overheating the driver tires or causing the same to slide or loosen. When either of the latter conditions occurs it is desirable to release the driver brakes. With present systems, however, this cannot be done with the regular brake valve without also releasing the train brakes, and if the train should be descending a grade in close proximity to obstructions on the track the train would get beyond control before the brake can again be re-applied.

In going down long grades it is necessary to frequently re-charge the train auxiliary reservoirs, but with existing systems this cannot be done without releasing all of the train brakes so that there is danger of the train getting beyond control of the engineer before the auxiliary reservoirs can be recharged and the brakes re-applied. In existing systems this is attempted to be overcome by providing pressure retaining valves on each car, which, however, must be set by the brakeman before the train brakes are released, and after they are released or after the bottom of the grade is reached, must be again turned down so as to give the engineer control of the brakes on the entire train. These pressure retaining valves are objectionable as it makes it necessary to depend upon the trainmen mentioned, whereas the ideal system should be so arranged that the entire control of the train even when going down long grades is in the hands of the engineer.

One of the objects of my invention is to overcome these defects and to provide a system wherein the locomotive brakes can be either entirely or partially released while still holding the train brakes, thus preventing overheating, loosening or sliding of the locomotive driver tires, or whereby the train brakes may be released while still holding the locomotive brakes, thus giving the engineer absolute control of his train in going down grades and enabling him to re-charge the train auxiliary reservoirs without liability of the train getting beyond control. Good brakes on the locomotive and tender are equal to the brake power on from 6 to 10 cars. Another defect with existing systems is due to the fact that after a train has been slowed up and the brakes are released, those on the forward end of the train release sooner than those on the rear, this being due to the serial or successive operation of the triple valves from the front to the rear of the train. This results in giving a jerk to the train, not only jolting and damaging merchandise and passengers, but also imposing a severe strain on the draft mechanism, frequently pulling out the draw heads or otherwise breaking the train in two, the latter being due to the fact that the rear end of the train is held by the brakes which are still applied, while on the front end the brakes are released.

By the system of independent control of the locomotive it is possible to retain the brakes on the locomotive while the train brakes are released, thus causing the slack of the train to bunch on the locomotive, and as soon as the brakes for the entire length of the train have been released the locomotive brakes can be released, thus overcoming the jolt to passengers and merchandise which usually occurs with the existing system and entirely obviating any tendency to strain the draft mechanism or pull the train in two.

With all air brake systems the compressed air when it leaves the pump is at a comparatively high temperature, and as it expands and cools the moisture contained therein is condensed and precipitated. This condensation, together with the dust in the air, will clog at the first enlargement in the train pipe back of the locomotive, which in existing systems is the triple valve of the tender. As a consequence much difficulty is experienced with tender triple valves. In cold weather the condensation and dirt freezes and entirely stops the operation of the valve. To avoid this trouble a drip bag is placed in the train pipe on the tender.

Another improvement in my system consists in dispensing entirely with the tender triple valve and so arranging the parts that the tender cylinder is controlled from the same triple valve as the driver cylinders. As a consequence the condensation taking place in the train pipe is collected at the usual bulb or drip-cup in advance of the triple valve of the first car of the train, or at the rear of the tender, thus preventing the liability of freezing and otherwise clogging the triple valves of the train.

A further object of the invention is to provide ports or passages in the driver brake control valve mechanism whereby the locomotive brakes may be applied by the admission of air directly thereto from the main reservoir, as may be necessary in case of emergency or in case of bursted train pipes, or after depletion of the locomotive auxiliary reservoir.

To the accomplishment of the foregoing improvements my invention consists in arrangement of parts hereinafter described and claimed.

In the accompanying drawings Figure 1 is a diagrammatic view showing my improved arrangement of air brake mechanism; Fig. 2 is a sectional view of the locomotive triple valve; Fig. 3 is a side view of the driver brake control valve; Fig. 4 is a vertical section therethrough; and Figs. 5, 6, 7 and 8 are sectional views taken respectively on the lines 5—5, 6—6, 7—7 and 8—8, Fig. 3, showing the different positions of the valve.

In my system the present arrangement on the individual cars need not be altered, and consequently I have shown only so much of the apparatus as is located on the locomotive and tender.

In the drawings I have shown my invention applied to a standard Westinghouse air brake system, this being the one most extensively in use, but my invention is equally applicable to any other automatic system, and I wish it understood that the specific illustration and description is not to impose any limitations on the terms of the claims hereinafter made.

In the drawings the main reservoir is shown at 1 with a pump connection at 2. This main reservoir is connected by means of a pipe 3 with an engineer's valve 4 which is shown as the standard type of Westinghouse engineer's valve, and which is provided with the usual operating handle 5, by means of which the brakes can be set either for full service, graduated service, or emergency application, as is now the practice with the most approved systems. Inasmuch as there are known to those skilled in the art a number of engineer's valves which will accomplish these purposes, I have not deemed it necessary to specifically illustrate the same. This engineer's valve is connected to the usual train pipe 6 which runs throughout the length of the train, and which is connected on each car to the usual triple valve, and through the latter with an auxiliary reservoir and brake cylinder. All of this part of the system will be understood without further illustration or description.

The locomotive driver-cylinders are indicated at 7,—one on each side of the locomotive as is now the practice. The tender brake cylinder is indicated at 8. Both the driver and tender cylinders are controlled from the same triple valve, the latter being shown at 9 and being illustrated in Fig. 2 as of the standard Westinghouse type such as now used for controlling driver brakes. As is well known this triple valve comprises a chamber 10 in which works the triple valve piston 11, the outer end of said chamber being connected to the train pipe by a connection 12. The piston stem 13 carries the usual slide valve 14 having a port 15 for connecting the valve chamber to the brake cylinder connection 16, and also having a recess 17 for putting said brake cylinder connection into communication with the exhaust port 18. The valve chamber is provided with a connection 19 which communicates with the locomotive auxiliary reservoir 20. This triple valve will be provided with the usual graduating valve 21, graduating stem 22 and graduating spring 23, all as are common with standard triple valves. The mode of operation of this valve is identical with that of the standard Westinghouse triple valve, and is well understood by those skilled in the art. In my improved system this triple valve serves to control both the driver and tender brake cylinders, and in the drawings the connection 16 is shown connected to the driver brake cylinders by means of a pipe 25, while the tender brake cylinder has connected thereto a pipe 26 which is connected by means of a branch 27 with the exhaust port 18 of the triple valve.

In order to control the tender and driver brakes independently of the train brakes, and also to supply air directly to the driver brakes, I provide the control valve mechanism shown at 30. This valve mechanism may be of various forms and might in fact be a series of independent cocks or valves connected together to operate in unison from a single controlling handle. It is shown as a casing provided with several ports, and an ordinary taper plug valve rotatable in said casing and provided with passages and grooves arranged to connect these ports in proper sequence to accomplish the foregoing results.

As shown, the valve casing is provided with the following ports: a port 33 connected by pipe 39 to the exhaust port of the triple valve; a port 34 leading to the atmosphere and constituting the triple valve exhaust port; a port 35 connected by the pipe 40 to the driver brake cylinders, or more specifically to the pipe 25 extending from the triple valve to the driver brake cylinders; a port 36 communicating with the atmosphere and constituting the brake cylinder exhaust port; a port 37 connected by the pipe 41 to the driver brake cylinders; and a port 38 connected by the pipe 42 to the main reservoir. The plug 44 is rotatable in this casing and is provided with the following passages and grooves: a horizontal passage 45 cored or bored in the body of the valve and arranged when the valve is in normal position shown in Fig. 5 to connect the ports 33 and 34; a spiral groove 46 arranged when the valve is in the position shown in Fig. 6 to connect the ports 33 and 35; a horizontal passage 47 cored or bored in the body of the plug and arranged when the latter is in the position shown in Fig. 7 to connect the ports 35 and 36; a horizontal groove 48 arranged when the plug is in the position shown in Fig. 7 to connect the ports 33 and 34; and a horizontal groove 49 arranged when the plug is in the position shown in Fig. 8 to connect the ports 37 and 38. This plug valve has four distinct positions and is adapted to be operated by any suitable handle such as shown at 50, the latter being provided with a detent 51 adapted to fall into notches 52, 53, 54 and 55 in a suitable disk on the valve casing and which indicate the four different positions of the valve. This controlling valve will be placed in close proximity to the ordinary engineer's valve so that the engineer can conveniently operate both valves.

The four positions of the valve are as follows:

First, normal or triple valve release position, shown in Fig. 5. In this position the passage or recess 45 in the plug will connect the ports 33 and 34, while all of the other ports in the valve casing will be closed. In this position of the valve the triple valve exhaust port will be connected directly to the atmosphere at the port 34, and the engineer can therefore control the brakes of the entire train, including the driver brakes, in the usual way by properly manipulating the handle 5 of the engineer's valve.

Second, lap position shown in Fig. 6, in which position all of the ports in the valve casing will be lapped or closed with the exception that the port 33 will be connected by the spiral groove 46 with the port 35, thus connecting the driver brake cylinders with the tender brake cylinder and keeping the triple exhaust port closed. When the valve is in this position and the train pipe reduction is made the brakes on the entire train including the tender brakes will be applied in the usual way. In this position the driver brake cylinders will be supplied with air from the auxiliary reservoir through the triple valve 9 in the usual way, and as the controlling valve connects the ports 33 and 35 this pressure will pass through this valve to the pipe 26 into the tender brake cylinder 8, thus applying the latter as well as the driver brake cylinders. In this position of the controlling valve the engineer has independent control of his train and driver and tender brakes. Should he desire to release the locomotive brakes without releasing the train brakes, which he would want to do in case of slipping or overheating of the driver tires, or in the case of a bursted hose, he will move the valve to the third position, namely, cylinder release position shown in Fig. 7. In this position the passage 47 in the plug valve connects the ports 35 and 36, thus exhausting the driver brake cylinders directly to the atmosphere, while the groove or passage 48 will connect the ports 33 and 34, thus also exhausting the tender brake cylinder directly to the atmosphere. In this position of the valve therefore the pressure of both the driver brake cylinder and tender brake cylinder will be simultaneously released, but as this operation does not affect the pressure in the train pipe the brakes on the remainder of the train will still be held. If the driver and tender brakes are again to be applied before releasing the train brakes the controller valve will be moved back to the second or lap position and a further reduction made in train pipe pressure by means of the engineer's valve.

Fourth, or emergency position shown in

Fig. 8. In this position the groove or passage 49 connects ports 37 and 38, thus admitting air directly from the main reservoir into the driver brake cylinders, or giving in effect a direct air application and enabling the engineer to control his driver brakes in case of an emergency when additional braking effect is desired, or in case his auxiliary reservoir pressure is depleted from any cause. In this position of the valve all of the other ports are lapped except that the passages 45 and 47 and spiral groove 46 will connect ports 34 and 36, but as both of these ports are open to the atmosphere this connection will have no effect on the braking system. When the valve is in the lap position the engineer is also enabled to release his train brakes without releasing the tender or driver brakes. To do this he will simply maintain the valve 44 at lap position and will then, through the usual engineer's valve, increase the train pipe pressure in the usual way so as to drive the triple valve pistons to release position. This will release the brakes on the entire train except on the tender and locomotive. The triple valve 9 will also of course be driven to release position, but inasmuch as its exhaust port is connected by means of the pipe 39 to the valve 30, and as the exhaust ports 34 in the controlling valve are lapped, it is clear that the pressure from the tender and driver brake cylinders cannot escape. As a consequence the brakes on the locomotive and tender will be retained while the brakes on the remainder of the train will be released. The engineer can therefore re-charge the auxiliary reservoirs of the entire train, including the reservoir 20 on the locomotive without danger of the train getting beyond his control. This operation will also preferably be made when bringing a train to a stop, thereby enabling the slack of the train to bunch up on the locomotive, and preventing the jolting or jarring which occurs with ordinary brake systems. This operation will also be employed when slowing down a train and prior to releasing the brakes, that is, the train will be slowed down in the usual way with the controlling valve 44 at lap position, then, when it is desired to again speed up, by means of the engineer's valve the train brakes will be released while still holding the locomotive and tender brakes with the controlling valve, and the latter will be left on lap until all of the train brakes are fully released, and then by moving said valve to either triple valve release or cylinder release position, the driver and tender brakes will also be taken off. This will entirely do away with the danger of straining the draft mechanism or pulling the train apart.

The usual running position of the valve 44 will be on lap, so that independent control of the engine and train brakes will be insured by the mere manipulation of the engineer's valve, and after the brakes have been set by the engineer's valve the releasing thereof by the engineer's valve will affect only the train brakes, whereas by leaving the engineer's valve on lap position and operating the control valve 44 the train brakes can be retained while the tender and driver brakes are released, thus giving the engineer absolute control of the train under all conditions.

If the engineer should desire to only partially set the driver brakes while the train brakes are fully set he will leave the valve 44 on cylinder release position while the first train pipe reduction is being made, so that the first pressure entering the driver brake cylinders will escape to the air. Then he will move the valve 44 to lap position and make a second reduction in train pipe pressure, which second reduction will add to the pressure in the train brake cylinders while the only pressure retained in the driver brake cylinders will be that which went in after the valve 44 had been placed on lap

What I claim is:

1. In air-brake apparatus, valve mechanism including a casing having ports adapted to communicate respectively with the main reservoir, the brake cylinder, and the release port of a triple valve on a locomotive, and having other ports adapted to communicate with the atmosphere, and a valve arranged to put the brake cylinder port and triple valve release port into communication with each other or either thereof in communication with the atmosphere, and also to put the brake cylinder port into communication with the main reservoir port.

2. In an air-brake system, the combination of a main reservoir, an engineer's valve, a driver brake cylinder and its triple valve, piping connecting these parts, and control valve mechanism connected to the main reservoir, to the driver brake cylinder, and to the triple valve exhaust port and arranged to put both the brake cylinder and the triple valve exhaust port into communication with the atmosphere or into communication with each other, or to put the triple valve exhaust port into communication with the atmosphere while keeping the brake cylinder port closed, or to put the main reservoir into communication with the brake cylinder.

3. In an air-brake system, the combination of a main reservoir, an engineer's valve, a driver brake cylinder and its triple valve, piping connecting these parts, a tender brake cylinder connected to the exhaust port of said triple valve, and control valve mechanism connected to the main reservoir, to the driver brake cylinder, and to the exhaust port of the triple valve, and arranged to put either the driver brake cylinder or triple valve exhaust port into communication with the atmosphere or into communication with each other, or to put the driver brake cylinder into communication with the main reservoir.

4. In an air brake system, the combination of a main reservoir, an engineer's valve, a driver brake cylinder, a tender brake cylinder, a triple valve common to said driver and tender brake cylinders, piping connecting these several parts, and control valve mechanism arranged by the manipulation of a single handle and to put the driver brake and tender brake cylinders into communication with the atmosphere, put the triple valve exhaust port into communication with the atmosphere while keeping the driver brake cylinder port closed, or to put the driver brake cylinder into communication with the main reservoir.

5. In an air-brake system, the combination of a main reservoir, an engineer's valve, a driver brake cylinder, a triple valve, piping connecting these parts, a tender brake cylinder connected to the exhaust port of said triple valve, and control valve mechanism arranged in its different positions to put the driver brake cylinder and tender brake cylinder into communication with the atmosphere, or to put the same into communication with each other, or to keep the triple valve exhaust port closed or open to the atmosphere while keeping the brake cylinder closed, or to put the driver brake cylinder into communication with the main reservoir.

6. In air-brake apparatus, valve mechanism including a casing having a port adapted to communicate with the brake cylinder, a companion port therefor leading to the atmosphere, a port connected to the exhaust port of the triple valve, a companion port therefor leading to the atmosphere, and another port communicating with the main reservoir, and a valve mounted in said casing and provided with a series of passages arranged so that in different positions of the valve they connect the brake cylinder port to the atmosphere, connect the triple valve exhaust port with the atmosphere, connect the brake cylinder with the triple valve exhaust port, and connect the brake cylinder with the main reservoir.

In testimony whereof, I the said FRANK H. DUKESMITH have hereunto set my hand.

FRANK H. DUKESMITH.

Witnesses:
F. W. WINTER,
ROBERT C. TOTTEN.